United States Patent [19]

Fontenot

[11] 4,417,907

[45] Nov. 29, 1983

[54] DEGASSING METHOD AND APPARATUS

[75] Inventor: Delouis J. Fontenot, Borger, Tex.

[73] Assignee: Phillips Petroleum Company, Bartlesville, Okla.

[21] Appl. No.: 302,918

[22] Filed: Sep. 16, 1981

[51] Int. Cl.³ .............................................. B01D 19/00
[52] U.S. Cl. .......................................... 55/38; 55/45
[58] Field of Search ....................... 55/38, 41, 45, 159, 55/171, 172, 174

[56] References Cited

U.S. PATENT DOCUMENTS

| | | | |
|---|---|---|---|
| 1,559,115 | 10/1925 | Marker et al. | 55/174 |
| 2,792,070 | 5/1957 | Strunk | 183/2 |
| 2,863,522 | 12/1958 | Smith | 55/171 |
| 2,865,470 | 12/1958 | Sochor | 55/41 |
| 2,874,798 | 2/1959 | Walker | 183/30 |
| 2,943,026 | 6/1960 | Pollock et al. | 202/64 |
| 2,998,016 | 8/1961 | Battenberg et al. | 137/8 |
| 3,253,414 | 5/1966 | Molique | 61/0.5 |
| 3,289,416 | 12/1966 | Varvel | 61/0.5 |
| 3,318,074 | 5/1967 | Keller, Sr. | 55/174 X |
| 3,455,144 | 7/1969 | Bradley | 73/19 |
| 3,547,190 | 12/1970 | Wilkerson | 55/171 X |
| 3,688,473 | 9/1972 | Brown | 55/38 |
| 3,854,906 | 12/1974 | Roffelsen | 55/159 |

*Primary Examiner*—Robert H. Spitzer

[57] ABSTRACT

A method and apparatus for reducing the size of bubbles in a liquid flowing through a conduit by passing the liquid past at least one tap affixed to and in open communication with the conduit. This method can be applied to the removal of a hydrocarbon saturated liquid brine from a salt bed storage cavern to substantially eliminate hydrocarbon surge to a flare.

11 Claims, 1 Drawing Figure

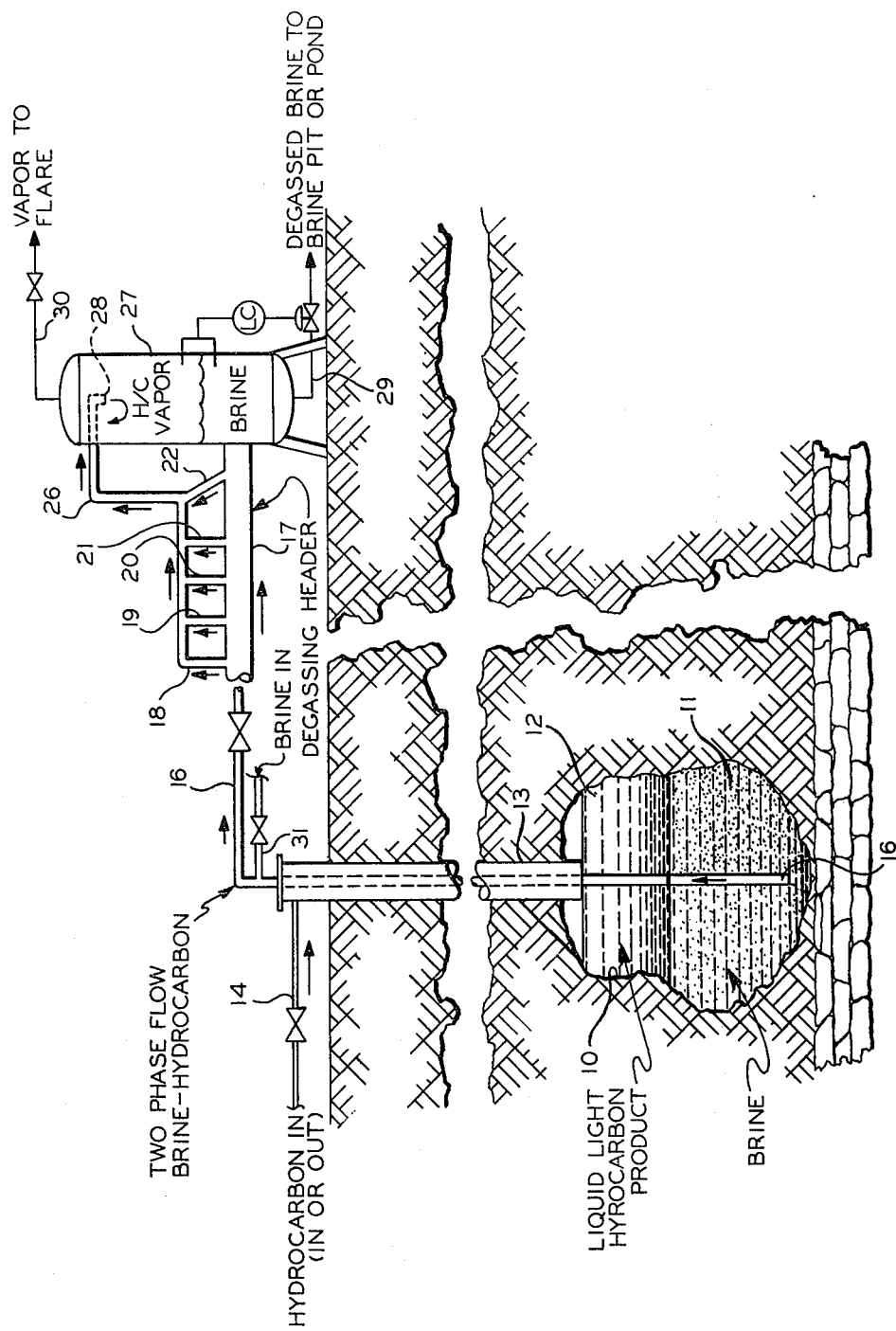

DEGASSING METHOD AND APPARATUS

This invention relates to a method and apparatus for minimizing the surging of fluids to a flare. This invention also relates to a method for reducing the size of gaseous bubbles in a two phase flow.

BACKGROUND

The storage of hydrocarbon fluids in underground caverns in salt beds is generally well known. See for example U.S. Pat. No. 3,253,414 which discloses the storage of a hydrocarbon fluid with a density lower than that of liquid brine in such a cavern.

When hydrocarbon fluid is pumped into a storage cavern, brine is forced out of the cavern to the surface where it may be stored in a brine pit. Conventionally this removed brine is passed to a liquid-gas disengagement vessel prior to storage in the pit. The liquid-gas disengagement vessel effects the separation of any hydrocarbon present in the brine. The separated hydrocarbon, as a gas or vapor, is normally charged to a flare means and the degassed brine is charged to a brine pit or pond where it remains available for reuse; e.g. to be pumped back into the cavern to effect removal of hydrocarbon.

The liquid brine in the relatively high pressure storage cavern is saturated with the light hydrocarbon stored over the brine. When the brine is removed from the cavern, two phase flow occurs along the removal flow path. The two phase flow comprises hydrocarbon gas bubbles and liquid brine. These gaseous hydrocarbon bubbles are relatively large at the downstream portion of the flow path since the pressure there is only slightly above atmospheric.

In prior operations this two phase flow of gaseous hydrocarbon and liquid brine has been charged directly into a liquid-vapor disengaging drum. The effect of the large gaseous hydrocarbon bubbles disengaging from the drum cause surging of the fluid to the flare. The result is an ecologically undesirable smokey flare.

SUMMARY

My invention eliminates this surging problem by providing a means to reduce the size of the gaseous hydrocarbon bubbles in the liquid brine. This minimizes the surging of hydrocarbon gas to the flare and, accordingly, reduces the smoke problem.

My invention comprises at least one tap or conduit affixed to and in open communication with the main conduit used to transfer liquid brine from a storage cavern to a disengagement drum. Preferably more than one tap is employed. The main conduit is normally horizontally positioned and the taps are usually vertically positioned along the upper portion of the main conduit, but any orientation is acceptable so long as gaseous hydrocarbon bubbles or portions thereof are able to escape from the main conduit and through the taps. The taps should also be in open communication with the hydrocarbon gas or vapor space within the disengaging drum. This is usually accomplished by use of a second conduit into which smaller bubbles of hydrocarbon gas or vapor, along with some liquid brine, are fed from the taps. This second conduit directs the fluid to the gas or vapor space within the disengaging drum. Preferably the outlet of the second conduit is turned downwardly in order to effect a more efficient separation of gaseous hydrocarbon from the accompanying liquid brine.

The system of my invention affords removal of degassed brine to a normally open brine pit, as do the prior art systems, but, unlike the prior art systems, produces a smooth, non-surging flow of hydrocarbon gas or vapor to the flare. Practice of my invention effects an even burning at the flare and substantially eliminates the problem of a smokey flare.

My invention is also adaptable to any two phase flow. Two phase flow as contemplated in this invention broadly comprises gaseous bubbles and a liquid and is not restricted to gaseous hydrocarbon bubbles and liquid brine.

Accordingly, it is an object of my invention to provide a method for reducing the size of gaseous bubbles in a two phase flow.

Another object of my invention is to provide a method for producing a non-surging flow of hydrocarbon gas to a flare.

A further object of my invention is to eliminate the problem of a smokey flare.

These and other objects will be made apparent from this disclosure of my invention and the appended claims.

BRIEF DESCRIPTION OF THE DRAWING

The drawing illustrates the introduction of hydrocarbon into an underground storage cavern in a salt bed and the removal of liquid brine from the cavern.

DETAILED DESCRIPTION

Numeral 10 represents the underground cavern having the heavier or more dense liquid brine 11 in the lower portion of the cavern, with the lighter or less dense hydrocarbon 12 stored above.

Pipe 13 allows introduction of hydrocarbon into the cavern by way of conduit 14. This path is also used for removal of hydrocarbon from the cavern. As the hydrocarbon enters the cavern, brine 11 is forced up pipe 16 and horizontal conduit 17 to disengaging drum 27. Spaced along conduit 17 and in open communication with the upper portion of conduit 17 are vertically oriented or positioned taps 18, 19, 20, 21, and 22. As the two phase material (liquid brine and gaseous hydrocarbon) flows through conduit 17, hydrocarbon gas and some entrained liquid brine pass from conduit 17 through taps 18, 19, 20, 21, and 22. These taps are of smaller cross-sectional area than the conduit 17. The cross-sectional area of the taps may vary in any manner desired.

Partially degassed liquid brine flows via conduit 17 into the disengaging drum, preferably below the liquid brine level therein. The resulting small bubbles of gas or vapor hydrocarbon along with some of the liquid brine is passed via conduit 26 and into the gas or vapor section of drum 27. Preferably, the outlet 28 of conduit 26 is directed downwardly to assist in separating the brine from the hydrocarbon gas or vapor. Hydrocarbon gas or vapor is passed via conduit 30 to the flare. Since the taps 18, 19, 20, 21, and 22 are used, the gaseous hydrocarbon bubbles produced or recovered are of smaller size than when the total two phase flow mass is passed directly into the drum 27. As a result of the smaller sized bubbles, a smoother flow of hydrocarbon gas or vapor to the flare is achieved. Degassed brine is removed via conduit 29 in response to a liquid level control, and passed to the brine storage pit. When it is desired to remove hydrocarbon from the cavern, brine is charged via 31 to the cavern and hydrocarbon is removed at 14.

Normally when loading hydrocarbon into the cavern a pressure of 500-700 psig is held upstream of the brine outlet header valve on the piping to the disengaging drum. This is called the balancing pressure and varies with the height of the brine column and the pressure on the cavern. At this point in the piping, because of the reduced pressure, the brine can hold only half the amount of hydrocarbon in solution that it can hold when in the high pressure (1800 psig) cavern environment. Thus, gas bubbles have already formed in 16 and additional gas, the other half, will go out of solution as the brine flows to the disengager drum 27 through conduit 17. The degassing header will start to reduce the size of these large gas bubbles as the bubbles reach the first drawoff conduit or tap 18. Any remaining portion of a bubble will be drawn out in the remaining taps 19, 20, 21, and 22 or will be reduced to a minor fraction of the original volume by the time the bubble reaches the base of the disengaging drum along with the main brine flow. The last tap from conduit 17 just upstream of the disengaging drum is slanted to permit almost all of the entrained brine from the upstream taps to drain into conduit 17, rather than being forced upwards in 26. It is expected that only about 2 volume percent of the brine in conduit 17 will be carried upwards with the gas bubbles. Most of the brine will flow directly to the base of the disengaging drum.

EXAMPLE

This example illustrates the addition of hydrocarbon to an underground storage cavern and the removal of liquid brine therefrom.

| (10) Cavern: | |
|---|---|
| Pressure, psig., | 1800 |
| Temperature, °F., | 115 |
| (16) At Surface of Ground: | |
| Pressure, psig., | 500 |
| Temperature, °F., | 90 |
| (27) Disengaging Drum: | |
| Pressure, psig., | 5 |
| Temperature, °F., | 90 |
| (16) Brine Flow: | |
| Barrels/hour, | 500 |
| NaCl, wt. % in brine, | 20 |
| Hydrocarbon, wt. %, | 0.45 (a) |
| Diameter of Conduit 16, inches | 6 |
| (17) Brine Flow: | |
| Barrels/hour, | 490 |
| NaCl, wt. % in brine, | 20 |
| Hydrocarbon, wt. %, | 0.045 |
| Diameter of Conduit 17, inches, | 12 |
| (18), (19), (20), (21), (22), Total Flow: | |
| Barrels/hour, | 10 (b) |
| NaCl, wt. % in brine, | 20 |
| Hydrocarbon, wt. %, | 18.5 (c) |
| -continued | |
| Conduit Sizes, Diameter, inches, | 4 (d) |

(a) existing mainly as relatively large bubbles of gas or vapor in the liquid brine at this locus.
(b) The flow will be in decreasing order from conduit taps 18, 19, 20, 21, and 22, even when using the same tap diameters for all taps. This figure is the total flow via all of the taps.
(c) The hydrocarbon exists as relatively small gas or vapor bubbles in the brine. These bubbles are considerably smaller than those in conduit 16, above. The estimated volume of each relatively smaller bubble is about one-sixth of the volume of the relatively larger bubbles in conduit 16.
(d) In this example all taps are of the same diameter. The diameters of these taps may be increased, or even decreased, along the flow path.

The brine is not fully saturated with NaCl and thus contains about 20 wt. % salt and weighs 10 lb/gallon.

The example is illustrative only and not intended to limit or define the scope of the invention in any restrictive manner. Reasonable modification and variation of my invention, not departing from the essence and spirit of my disclosure, is contemplated to be within the scope of the appended claims.

I claim:

1. A method comprising:
passing a two phase flow comprising gaseous bubbles and liquid through a first conduit which is open communication with a gas-liquid disengaging zone; wherein said gas-liquid disengaging zone contains liquid and has a gas space; wherein the interface between said liquid contained in said disengaging zone and said gas space defines a liquid level;
passing liquid from said first conduit into said disengaging zone at a location below said liquid level;
allowing gaseous bubbles to break up and escape from said first conduit by passing said gaseous bubbles through at least two taps in open communication with said first conduit; wherein said at least two taps are in open communication with said first conduit at locations lower than said liquid level; wherein at least a portion of each of said at least two taps is higher than said liquid level;
allowing gaseous bubbles escaping from said first conduit through said at least two taps to enter a second conduit in open communication with said gas space in said disengaging zone; wherein said taps are sufficiently disposed from a horizontal orientation to allow gaseous bubbles to escape from said first conduit to said second conduit;
passing gaseous bubbles from said second conduit into said gas space in said disengaging zone; and
removing gas from said disengaging zone.

2. A method according to claim 1 wherein said gaseous bubbles are gaseous hydrocarbon bubbles.

3. A method according to claim 2 wherein said liquid is liquid brine.

4. A method according to claim 2 wherein gas removed from said gas-liquid disengaging zone is passed to a flare for burning.

5. A method according to claim 1 wherein said at least two taps are substantially vertical.

6. A method according to claim 5 wherein at least a portion of said first conduit is substantially horizontal.

7. A method according to claim 6 wherein at least a portion of said second conduit is substantially horizontal.

8. A method according to claim 1 wherein said gas-liquid disengaging zone is a gas-liquid disengaging drum.

9. A method according to claim 1 wherein gaseous bubbles from said second conduit enter said gas space in said gas-liquid disengaging zone through a downwardly oriented outlet.

10. A method according to claim 1 wherein said two phase flow is introduced into said first conduit from a storage means.

11. A method according to claim 10 wherein said storage means is an underground cavern.

* * * * *